United States Patent
Braines et al.

(10) Patent No.: US 9,948,586 B2
(45) Date of Patent: Apr. 17, 2018

(54) INTELLIGENT INFORMATION SHARING SYSTEM

(71) Applicant: International Business Machines Corporation, Armonk, NY (US)

(72) Inventors: David S. Braines, Hampshire (GB); Andrew S. Feltham, Hampshire (GB); Dominic P. Harries, Winchester (GB); Graham White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 14/724,863

(22) Filed: May 29, 2015

(65) Prior Publication Data

US 2016/0352664 A1 Dec. 1, 2016

(51) Int. Cl.
- *G06F 15/16* (2006.01)
- *H04L 12/58* (2006.01)
- *G06F 3/0484* (2013.01)

(52) U.S. Cl.
CPC .......... *H04L 51/10* (2013.01); *G06F 3/04842* (2013.01); *H04L 51/36* (2013.01)

(58) Field of Classification Search
CPC ...... H04L 51/10; H04L 51/36; G06F 3/04842
See application file for complete search history.

(56) References Cited

U.S. PATENT DOCUMENTS

| | | | |
|---|---|---|---|
| 7,117,207 B1 * | 10/2006 | Kerschberg | G06F 17/30702 |
| 8,495,001 B2 * | 7/2013 | Sweeney | G06N 5/022 |
| | | | 706/55 |
| 8,650,210 B1 * | 2/2014 | Cheng | G06F 17/30864 |
| | | | 707/707 |
| 9,449,050 B1 * | 9/2016 | Molina | G06F 17/3053 |
| 9,473,444 B2 | 10/2016 | Schneider et al. | |
| 9,684,656 B2 | 6/2017 | Ning | |
| 2005/0154723 A1 * | 7/2005 | Liang | G06F 17/30109 |
| 2006/0047649 A1 * | 3/2006 | Liang | G06F 17/30864 |
| 2006/0106793 A1 * | 5/2006 | Liang | G06F 17/30654 |

(Continued)

OTHER PUBLICATIONS

Disclosed Anonymously, "A system and method of contact recommendation based on dynamic dimension," IP.com IP.com No. 000239895, Dec. 10, 2014, 13 pages.

*Primary Examiner* — Moustafa M Meky (74) *Attorney, Agent, or Firm* — Erik K. Johnson (57) ABSTRACT

Embodiments of the present invention disclose a method, computer program product, and system for information sharing. The method may receive user created content from a user. It may then extract information, having one or more types of information from the user created content. At least one type of the extracted information is semantic concepts. It may then determine one or more messaging platforms on which to share the user created content. It may determine that based on at least a correlation between: the extracted information; and historical data correlating the extracted information with what messaging platforms the user created content was sent to. I may notify the user of the one or more determined messaging platforms. It may receive a selection from the user of one or more determined messaging platforms. It may transmit the user created content to the selected messaging platform or platforms.

20 Claims, 4 Drawing Sheets

(56) References Cited

U.S. PATENT DOCUMENTS

| | | | |
|---|---|---|---|
| 2008/0249966 A1* | 10/2008 | Luege Mateos | G06F 17/3069 706/11 |
| 2011/0295780 A1 | 12/2011 | Tyson et al. | |
| 2011/0295903 A1* | 12/2011 | Chen | G06F 17/30598 707/794 |
| 2012/0143880 A1* | 6/2012 | Sweeney | G06F 17/30867 707/749 |
| 2012/0150874 A1* | 6/2012 | Sweeney | G06F 17/2785 707/749 |
| 2012/0179642 A1* | 7/2012 | Sweeney | G06F 17/2785 706/55 |
| 2012/0185544 A1 | 7/2012 | Chang et al. | |
| 2012/0290672 A1* | 11/2012 | Robinson | G06Q 10/10 709/206 |
| 2012/0323899 A1* | 12/2012 | Ilyas | G06F 17/30867 707/723 |
| 2013/0080915 A1 | 3/2013 | Lewis et al. | |
| 2013/0304731 A1* | 11/2013 | Zheng | G06Q 30/0201 707/728 |
| 2014/0101568 A1 | 4/2014 | Skyrm et al. | |
| 2014/0215349 A1* | 7/2014 | Kosslyn | G06Q 30/0631 715/745 |
| 2014/0357242 A1 | 12/2014 | Klassen et al. | |
| 2015/0088492 A1* | 3/2015 | Liu | G06Q 50/01 704/9 |
| 2015/0347593 A1* | 12/2015 | Tsai | G06Q 50/01 707/722 |
| 2015/0356418 A1* | 12/2015 | Yampolska | G06Q 30/02 707/739 |
| 2016/0080292 A1 | 3/2016 | Szeto | |
| 2016/0337286 A1* | 11/2016 | Bastide | H04L 51/12 |

\* cited by examiner

INTELLIGENT INFORMATION SHARING SYSTEM

BACKGROUND

The present invention relates to sharing user created content, and more particularly to determining platforms for sharing content based on a user's history.

Modern programming languages may be able to use semantics from written or verbal communication to determine a meaning of the communication. Semantics involves the determination of meaning, as inherent at the levels of words, phrases, sentences, and larger units of discourse.

BRIEF SUMMARY

Embodiments of the present invention disclose a method, computer program product, and system for information sharing. The method may receive user created content from a user. It may then extract information, having one or more types of information from the user created content. At least one type of the extracted information is semantic concepts. It may then determine one or more messaging platforms on which to share the user created content. It may determine that based on at least a correlation between: the extracted information; and historical data correlating the extracted information with what messaging platforms the user created content was sent to. I may notify the user of the one or more determined messaging platforms. It may receive a selection from the user of one or more determined messaging platforms. It may transmit the user created content to the selected messaging platform or platforms.

DETAILED DESCRIPTION

Embodiments of the present invention are directed generally to a system that receives user created content, and determines possible outlets, such as social media or private messages, for sharing the user created content with other people. This may be done by determining core concepts related to the user created content by identifying and analyzing metadata and semantic concepts in the user created content, and any attachments associated with it. Analysis of the core concepts using historical data, and criterion about certain social media outlets, may be performed in order to make a determination of outlets for the user created content.

Figure 1:
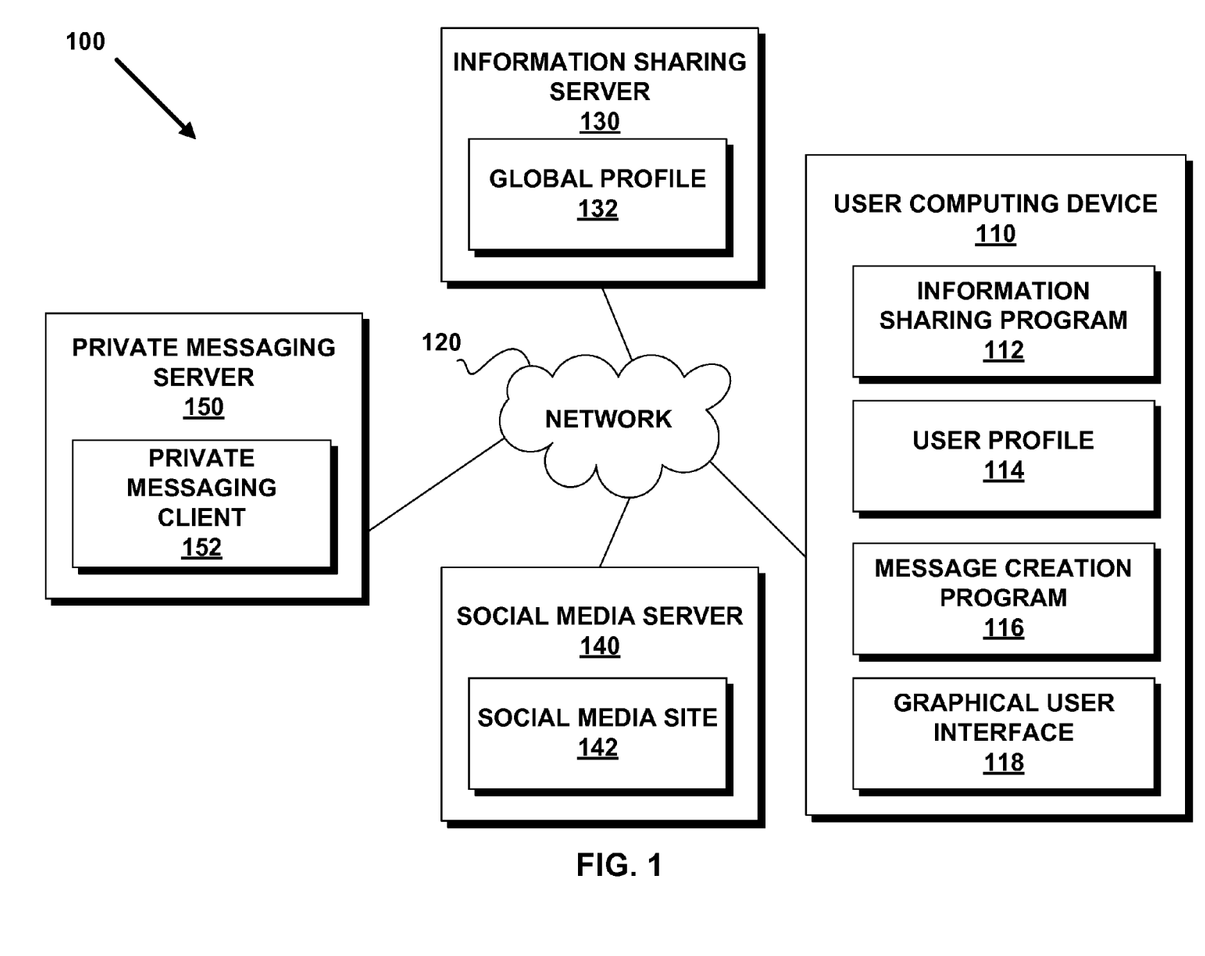
FIG. 1 illustrates an intelligent information sharing environment, in accordance with an embodiment of the invention.

FIG. 1 illustrates intelligent information sharing system 100, in accordance with an embodiment of the invention. In an example embodiment, intelligent information sharing system 100 includes a user computing device 110, information sharing server 130, social media server 140, and private messaging server 150, all interconnected via a network 120.

In the example embodiment, network 120 is the Internet, representing a worldwide collection of networks and gateways to support communications between devices connected to the Internet. Network 120 may include, for example, wired, wireless or fiber optic connections. In other embodiments, network 120 may be implemented as an intranet, a local area network (LAN), or a wide area network (WAN). In general, network 120 can be any combination of connections and protocols that will support communications between the user computing device 110, information sharing server 130, social media server 140 and private messaging server 150.

Social media server 140 represents one or more network based computing environments that support social media applications, such as a social media site 142, that may host and share user created content. Social media server 140 may be a desktop computer, a notebook, a laptop computer, a thin client, such as user computing device 110 via network 120, in accordance with one or more embodiments of the invention. Social media server 140 may also comprise a cluster of web servers to collectively process the requests for web pages as distributed by a front end server and a load balancer. Social media server 140 may include internal and external hardware components, as depicted and described in further detail below with reference to FIG. 4.

Social media site 142, located on a social media server 140, represents a network application, such as a social media website or intranet site, that receives and shares user created content in virtual communities and social networks. In some embodiments, such communities or social networks may be constrained to selected people with definite interpersonal connections to the user (e.g. friends, family, and coworkers). In other embodiments, such communities may be particular webpages open to the public (e.g. blogs, forums). In yet other embodiments, such communities or networks may be restricted access webpages (e.g. work intranet pages).

Private messaging server 150 represents one or more network based private messaging applications, such as a private messaging client 152, that may receive user content and share it with a specified user. Private messaging server 150 may be a desktop computer, a notebook, a laptop computer, a thin client, such as user computing device 110 via network 120, in accordance with one or more embodiments of the invention. Private messaging server 150 can comprise a cluster of web servers executing the same software to collectively process the requests for the private messaging client 152 as distributed by a front end server and a load balancer. Private messaging server 150 may include internal and external hardware components, as depicted and described in further detail below with reference to FIG. 4.

Private messaging client 152, located on a private messaging server 150, may be an e-mail client or instant messaging service capable of sending the user created content directly to a selected group of recipients or individual recipient. The selected group of users may be a user created group (e.g. a project group).

Information sharing server 130, which is described in more detail below, represents one or more network-based applications that may collect and disseminate historical data or statistics of a collection of users, either as a general population, or based on specific user characteristics. This information may be used, for example, to aid in determining where user created content will be shared. Information sharing server 130 may be a desktop computer, a notebook, a laptop computer, a tablet computer, a handheld device, a smart-phone, a thin client, or any other electronic device or computing system capable of receiving and sending data to and from other computing devices such as user computing device 110 via network 120. Information sharing server 130 may include internal and external hardware components, as depicted and described in further detail below with reference to FIG. 4.

User computing device 110 represents a user computing environment that receives user created content, and then disseminates that content to one or more platforms connected to the user computing device via the network 120. The user computing device 110 also contains files and programs capable of determining where the user created content should be shared.

User computing device 110 includes information sharing program 112, user profile 114, message creation program 116, and graphical user interface 118. In the example embodiment, user computing device 110 is a desktop computer, a notebook, a laptop computer, a smart phone, a tablet computer, a handheld device, a thin client, or any other electronic device or computing system capable of receiving and sending data to and from other devices via network 120, and capable of operating a graphical user interface, in accordance with an embodiment of the invention. User computing device 110 may include internal and external hardware components, as depicted and described in further detail below with reference to FIG. 4.

Graphical user interface (GUI) 118 represents a user interface for the entry of user created content. GUI 118 may represent a standalone application, such as a web browser that interfaces to a network application, for example, social media site 142 or private messaging client 152, or an application residing on user computing device 110, such as message creation program 116. GUI 118 may also represent an integral component of an application residing on user computing device 110, such as message creation program 116, that functions to receive user created content.

Message creation program 116 represents a client-side application that receives user created content and transmits it to one or more messaging platforms. In an exemplary embodiment, the message creation program 116 may create user content that may include text, audio, video, spreadsheets, word processor documents, and other attachments received via GUI 118. In an example embodiment, the message creation program 116 may be, for example, an e-mail client, a social media smartphone app, such as an app to access Facebook, Twitter, Instagram, etc. In various embodiments of the invention the user created content, generated by message creation program 116, may additionally include metadata about the message such as, for example, time, date, sender/creator, app that created it, and destinations or recipients of the user created content.

Information sharing program 112 operates generally to make determinations of where user created content should be shared. The determinations are based on metadata and semantic concepts contained in the user created content, historical data contained in a user profile 114 and/or a global profile 132, both described in more detail below, and characteristics of the messaging platform or platforms on which user content is shared.

Figure 2:
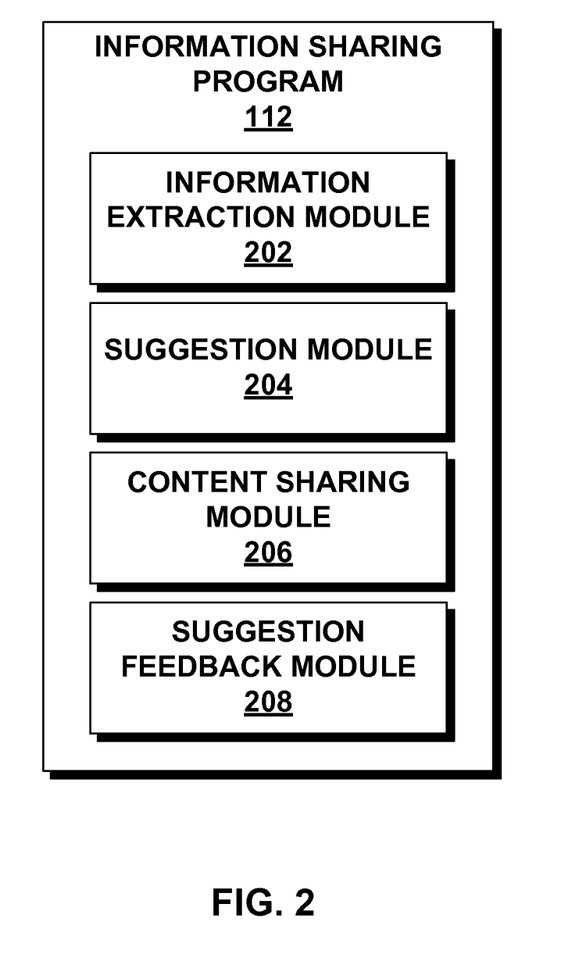
FIG. 2 is a functional block diagram of the information sharing program of FIG. 1, in accordance with an embodiment of the invention.

FIG. 2 is a functional block diagram of information sharing program 112, in accordance with an embodiment of the invention. As mentioned above, information sharing program 112 operates generally to make determinations of where to share user created content, based on metadata and semantic concepts contained in the user created content, as well as historical data contained in a user profile 114 and/or a global profile 132. Information sharing program 112 identifies the metadata and determines the semantic concepts contained in the user created content. It then determines where the user created content should be shared based on the semantic concepts and metadata, as well as user profile historical data. The determined method of sharing content is displayed to the user, and user profile information is updated based on the user's acceptance of the suggested method of sharing. Information sharing program includes an information extraction module 202, a suggestion module 204, a content sharing module 206, and a suggestion feedback module 208.

Information extraction module 202 receives the user created content from the message creation program 116. This may be accomplished, for example, by using a plug-in detecting the entry of user created content in the message creation program 116.

The information extraction module 202 extracts one or more types of information, metadata, from the received user created content such as, for example, the size of user created content, the age of the created content when shared, the file type of the created content, and the original creator of any attached user created content. Additionally, the information extraction module 202 extracts another type of information, semantic concepts, from the text of the user created content as well as any attachments to the user created content. The semantic concepts may include key words or phrases in the user created content or attachments that may indicate the subject matter, meaning, tone, or intent of the message. Semantic concepts may include concepts such as, for example, whether the created content is inquisitive or informative, whether the created content is private or public, whether the created content pertains to certain industries, or whether the created content is work or personal. The information extraction module 202 may use any of a number of commercially available or open source programs, such as, for example, OpenCalais™, Language Ware™, or SPSS Modeller™.

Suggestion module 204 operates generally to receive the metadata and semantic concepts extracted from the received user created content by information extraction module 202, as well as historical data from user profile 114 and global profile 132 (FIG. 1), described in more detail below, and generates suggestions as to the one or more social media applications, or one or more private messaging systems, which the user created content might best be shared.

Returning to FIG. 1, user profile 114 contains information about characteristics of the user, and historical data on how the user has previously shared user created content. The historical data contains information on which social media platform or platforms, or private messaging service or services, the user has shared user created content, based on the metadata and semantic concepts contained in the user created content. As will be described in more detail below, the historical data is received from suggestion feedback module 208 at the time the user selects a social media platform or platforms on which to share user created content. The user profile 114 may also have information regarding specific recipients, such as email recipients, blog pages, twitter handles, etc., who have received user created content from the user, based on the semantic concepts and metadata contained in the user created content. The user profile 114 may also contain certain characteristics of the user such as, for example, demographics of the user (e.g. age, gender), education and income levels of the user, and career of the user, social media sites the user belongs to, etc.

Global profile 132 may contain aggregated historical data of how a plurality of users who participate in intelligent information sharing system 100 have shared their user created content, based on the metadata and semantic concepts contained in the user created content. The global profile 132 may represent the entire global community, or subsets of the global community corresponding to specific characteristics of the user. The aggregated historical data is based on the data contained in user profiles 114. As will be described in more detail below, such historical data may be received from suggestion feedback module 208. In certain embodiments, the aggregated user historical information may be supplemented with information from other sources, such as other user content sharing environments, private, public, and academic research results, etc.

Returning to FIG. 2, suggestion module 204 receives the extracted information from the information extraction module 202, as well as historical data from user profile 114 and global profile 132. The suggestion module 204 determines on which social media or private messaging platforms user created content containing the same, or similar, metadata and semantic concepts as those in the extracted information have been shared. The suggestion module may base the determination on the correlation between the historical data from the user profile 114 and global profile 132, and which messaging platforms (e.g. private messaging client 152 and social media site 142) the user created content containing the extracted information was previously shared on. The historical data may be weighted based on the robustness of historical data contained in the user profile 114. For example, when a new user first starts using the information sharing program 112, the user profile 114 contains little or no data, and the suggestion module 204 may weigh the data contained in the global profile 132 more highly. As the user profile 114 receives more data concerning a specific semantic concept or piece of metadata, and thus becomes more robust, the suggestion module 204 increases the weighting of the data from the user profile 114. Suggestion module 204 determines the likelihood a specific platform would be used to share the user created content using the correlation between information contained in the user created content, and the historical data from the user profile 114 and global profile 132. The platforms for sharing content may be, but are not limited to, e-mail, instant messaging, blogs, forums, microblogs, social media sites, or any combination thereof. The suggestion module 204 may also determine specific accounts on each platform to send the information to such as, for example, e-mail or instant messaging recipients; specific blogs or forums pertaining to the created content; or microblogs and social media sites best situated for the content created, using the correlation between information contained in the user created content, and the historical data from the user profile 114 and global profile 132.

For example, the suggestion module 204 may use data from user profile 114 to determine that messages containing questions may be suited for emails or forum posts, while statements explaining a process may generally correspond to blog posts, based on historical data correlating user created content having questions with emails or forum posts and user created content having statements to blog posts. In another example, suggestion module 204 may use data from user profile 114 to determine that topics that correspond to private matters (e.g. banking) may be more likely to be shared with small, closed, groups, while topics corresponding to public matters (e.g. sports) may be more likely to be shared on public social media sites.

A content sharing module 206 may display, or notify, the determinations created by the suggestion module 204 to the user using the graphical user interface 118. The content sharing module 206 shares the most likely platform to the user, as well as any additional platform or platforms (or recipients) that are above a threshold of likeliness. In one embodiment, the platforms may be shared in a ranked order. The one or more suggestions are presented to the user, and the content sharing module 206 may receive a selection from the user, who can accept the suggestion and share the user created content through the suggested one or more platforms, or deny the suggestion (either partially or totally) and the user may determine any additional or supplementary platform or platforms for sharing the user created content. For example, the content sharing module 206 may suggest sharing the created content with a specific email group, as well as through a blog post. The user can accept both suggestions (e.g. shared via e-mail and blog), share via different means (e.g. shared via forum post), or a combination of the two (e.g. shared via e-mail and forum post). The content sharing module 206 then distributes the user created content to other programs such as, for example, social media site 142 and private messaging client 152. In an additional embodiment, the content sharing module 206 may present the user with reasons for the suggestion, such as the size of the user created content, or due to specific semantic concepts contained in the user created content.

Suggestion feedback module 208 may update the user profile 114, or global profile 132, based on the user's decision on whether to accept or modify the suggestion from the content sharing module 206. In updating the user profile 114, the weighting given to certain metadata or semantic concepts, may change to adjust to the user's personal preferences. In updating the global profile 132, the user's choices maybe be aggregated with the choices of many different users in order to improve the data for the general population, and a user's characteristics, of the global profile 132.

Figure 3:
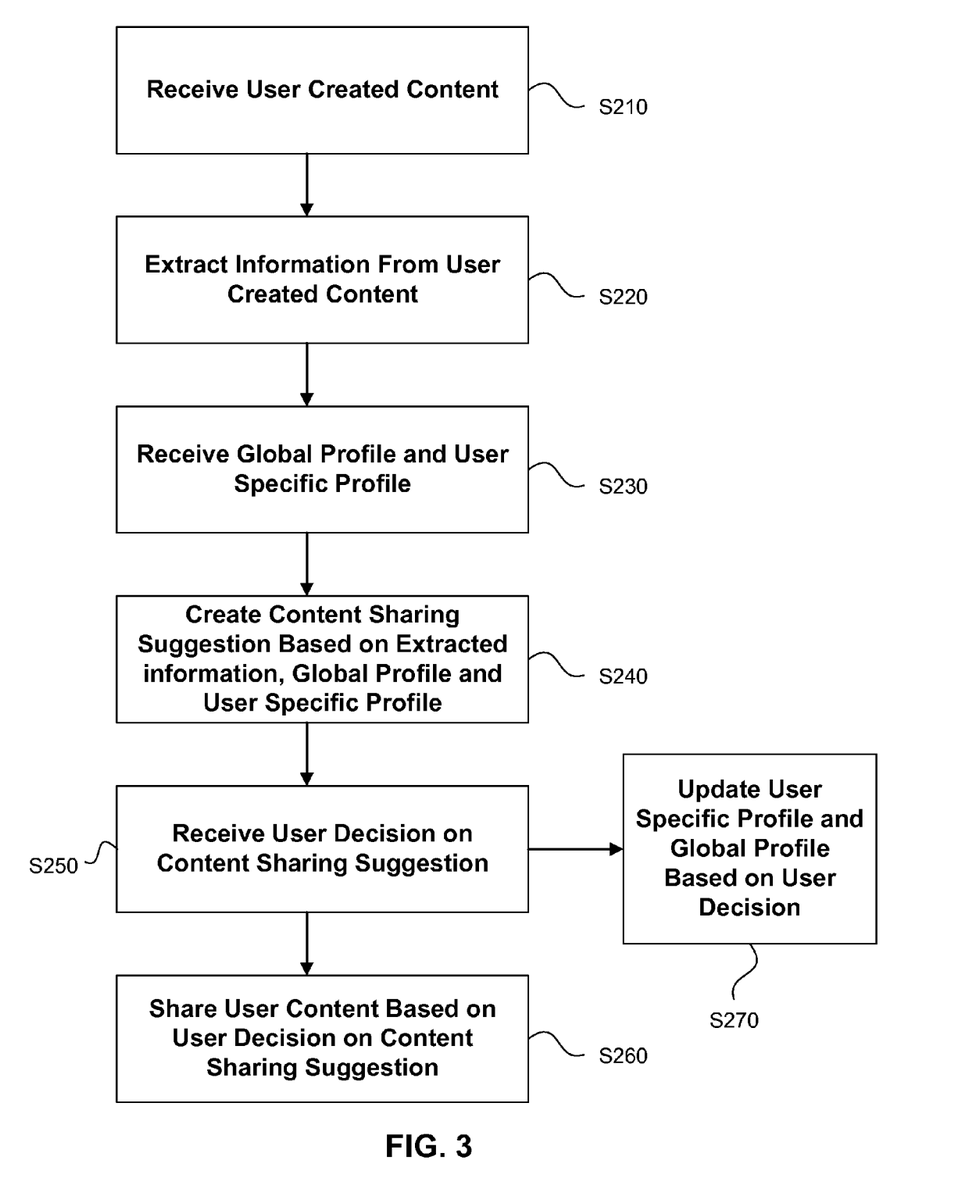
FIG. 3 is a flowchart illustrating the operational steps of the intelligent information sharing program of FIG. 1, in accordance with an embodiment of the invention.

FIG. 3 is a flow chart illustrating a method for the information sharing program 112. The information sharing program 112 receives user created content from message creation program 116 (step S210). The message creation program 116 may be any user interface capable of receiving text from a user, as well as attaching other multimedia files using the interface.

Information sharing program 112 then extracts information from user created content using information extraction module 202 (step S220). The information extraction module 202 may extract information such as metadata or semantic concepts from the created content. The information extraction module may extract metadata from the message or attachments such as, for example, message length, file size, file type, and encryption. Additionally, the information extraction module 202 may extract semantic concepts from the message or attachments such as, for example, tone of the message, key phrases and key concepts.

Information sharing program 112 receives a user profile 114 and a global profile 132 (step S230). User profile 114 and global profile 132 may be historical profiles of user decisions or global decisions, respectively, on how created content with similar metadata, or semantic concepts, have been shared in the past. Such historical profiles may include likelihood of sharing to different platforms, as well as weighting the influence different terms have on the location the user created content is ultimately shared.

Information sharing program 112, through suggestion module 204, creates a content sharing suggestion based on the extracted information from the information extraction module 202, the user profile 114 and the global profile 132 (step S240). The suggestion module 204 uses the historical profiles of user profile 114 and global profile 132 in combination with the extracted information, to determine suggestions of where a user may share the created content. The suggestion module 204 displays the top suggestion of where to share created content, as well as any other suggestions that meet a threshold likelihood that a user would share the created content through the specific platform or platforms suggested. In additional embodiments, the suggestion module 204 may also display the reasoning for suggesting each specific platform (e.g. private v. public information, question v. explanation).

Information sharing program 112, through content sharing module 206, receives the user's response to the content sharing suggestion (step S250). The user may accept the suggestion or suggestions of the suggestion module 204. In the alternative, the user may accept only part of the suggestion of the suggestion module 204 (e.g. only 2 of 5 suggestions), or may suggest an additional platform or platforms for sharing the created content.

Information sharing program 112, through content sharing module 206, shares the created content based on the user's response to the content sharing suggestion (step S260). The created content is sent to the specific platforms selected by the user such as, for example, a private messaging client 152 (e.g. e-mail, instant messenger) or social media site 142 (e.g. blog, forum, micro-blog).

Information sharing program 112, through content sharing module 206, updates the user profile 114 and the global profile 132 (step S270). Update to the user profile 114 and the global profile 132 may be based on the user's decision of how to share the created content from step S250. Updates to a global profile 132 may be aggregated with decisions from many other users to create a more robust global profile 132.

The following examples are meant to illustrate the above system and method. In a first example, a user creates content by writing text and attaching a .jpg image and a .pdf document. The information extraction module 202 determines the following information: user wishes to share with "ABC Bank group"; ABC Bank is mentioned; the term "accounts" are mentioned in the attachment; an "architecture" is mentioned in the attachment; the "Linux," "Mobile" and "XBank" are mentioned in the text; "banking" has been mentioned in the text; the attached .pdf was created 2 weeks prior, is 50 kb in size, and is password protected; the image was created today and is 1024×768 pixels; and the user wishes to share it with the ABC group. Information from user profile 114 and global profile 132, suggests that: 50% of the occasions ABC Bank is mentioned it is private; 100% of the times that accounts are mentioned it is private; in banking, 20% of the time architecture is private; Linux and Mobile are not-private terms, while X-Bank is not known; accounts are typically only sent to an "ABC Bank" contact list; last time user wrote about ABC Bank it was a blog post on a private company intranet page; and the user often shares information on an private company intranet forum. Using the information from user profile 114 and global profile 132, with the information from information extraction module 202, suggestion module 204 may make the following inferences: documents mentioning system architecture may be for wide audiences; accounts are not shared; and recent attachments are likely to contain current information. The suggestion module 204 may suggest the following, which is displayed to the user by content sharing module 206: distribute content to private company intranet forum, distribute content as a blog post on a private company intranet page, and distribute content as an e-mail to the "ABC Bank group." When queried, the content sharing module 206 may suggest a rationale to a user that some aspects of the content are interesting to a wide audience, however a particular customer has been mentioned along with recent accounts which would suggest the content is private, and not to be shared with a public audience, and sharing through restricted access sites is suggested.

Figure 4:
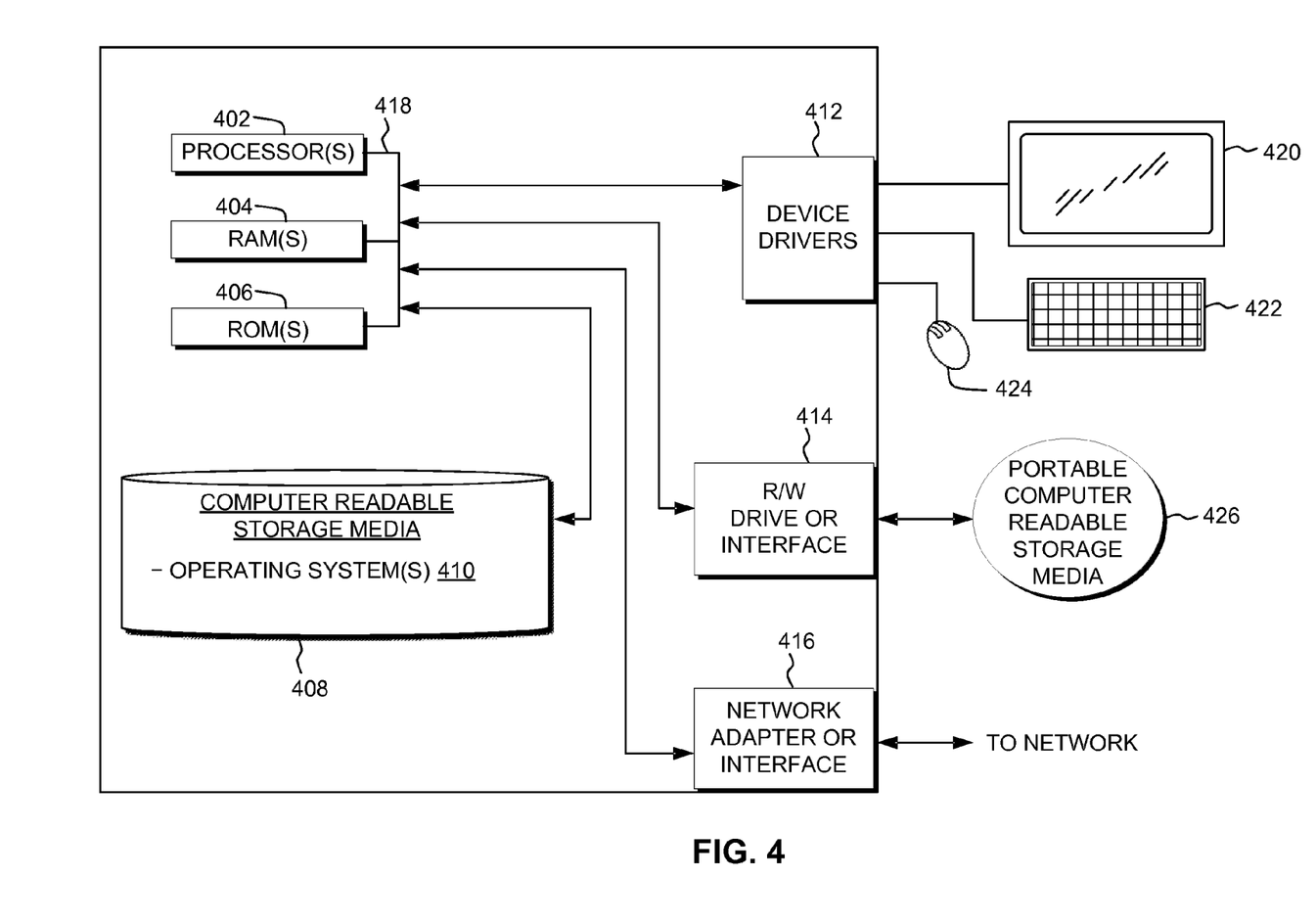
FIG. 4 is a block diagram depicting the hardware components a user computing device and a server of FIG. 1, in accordance with an embodiment of the invention.

FIG. 4 depicts a block diagram of components of the user computing device 110 information sharing server 130, social media server 140, and private messaging server 150 of intelligent information sharing system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The user computing device 110, information sharing server 130, social media server 140, and private messaging server 150 can include one or more processors 402, one or more computer-readable RAMs 404, one or more computer-readable ROMs 406, one or more tangible storage devices 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within a system.

One or more operating systems 410, the programs information sharing program 112, user profile 114, message creation program 116 and graphical user interface 118 in user computing device 110; global profile 132 in information sharing server 130; social media site 142 in social media server 140; and private messaging client 152 in private messaging server 150 are stored on one or more of the computer-readable tangible storage devices 408 for execution by one or more of the processors 402 via one or more of the respective RAMs 404 (which typically include cache memory). In the illustrated embodiment, each of the computer-readable tangible storage devices 408 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 110, information sharing server 130, social media server 140, and private messaging server 150 can also include a R/W drive or interface 414 to read from and write to one or more portable computer-readable tangible storage devices 426. Information sharing program 112, user profile 114, message creation program 116 and graphical user interface 118 in user computing device 110; global profile 132 in information sharing server 130; social media site 142 in social media server 140; and private messaging client 152 in private messaging server 150 can be stored on one or more of the portable computer-readable tangible storage devices 426, read via the respective R/W drive or interface 414 and loaded into the respective computer-readable tangible storage device 408.

The user computing device 110, information sharing server 130, social media server 140, and private messaging server 150 can also include a network adapter or interface 416, such as a TCP/IP adapter card or wireless communication adapter (such as a 4G wireless communication adapter using OFDMA technology). The information sharing program 112, user profile 114, message creation program 116 and graphical user interface 118 in user computing device 110; global profile 132 in information sharing server 130; social media site 142 in social media server 140; and private messaging client 152 in private messaging server 150 can be downloaded to the computing device from an external computer or external storage device via a network (for example, the Internet, a local area network or other, wide area network or wireless network) and network adapter or interface 416. From the network adapter or interface 416, the programs are loaded into the computer-readable tangible storage device 408. The network may comprise copper wires, optical fibers, wireless transmission, routers, firewalls, switches, gateway computers and/or edge servers.

The user computing device 110, information sharing server 130, social media server 140, and private messaging server 150 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 can comprise hardware and software (stored in computer-readable tangible storage device 408 and/or ROM 406).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method and program product have been disclosed for a presentation control system. However, numerous modifications and substitutions can be made without deviating from the scope of the present invention. Therefore, the present invention has been disclosed by way of example and not limitation.

What is claimed is:

1. A method for information sharing, the method comprising:
    receiving, by a computer, user created content from a user;
    extracting information, comprising one or more types of information, by a computer, from the user created content, wherein at least one type of information is semantic concepts;
    determining, by a computer, one or more messaging platforms on which to share the user created content, based on at least a correlation between: the extracted information; and historical data, wherein the historical data indicates a correlation between the extracted information to at least one of the one or more messaging platforms;
    notifying the user of the one or more determined messaging platforms;
    receiving a selection from the user of one of the one or more determined messaging platforms; and
    transmitting the user created content to the selected messaging platform.

2. The method of claim 1, wherein notifying the user of the one or more determined messaging platforms further comprises notifying the user of the one or more determined messaging platforms in a ranked order based on the degree of correlation between the extracted information, and historical data correlating which extracted information was sent to which messaging platforms.

3. The method of claim 1, wherein the historical data comprises one or both of:
    historical data correlating which extracted information the user sent to which messaging platforms; and
    historical data correlating which extracted information a plurality of users sent to which messaging platforms.

4. The method of claim 1, further comprising updating the historical data with information related to the user selected messaging platform and the extracted information.

5. The method of claim 1, wherein the historical data contains historical data correlating characteristics of the user with which messaging platforms the user created content was sent to.

6. The method of claim 1, wherein the one or more types of information further includes metadata describing one or more of: type of the user created content, size of the user created content, date of the user created content, originating platform of the user created content, and creator of the user created content.

7. The method of claim 1, wherein determining, by a computer, one or more messaging platforms on which to share the user created content further comprises determining, by a computer, one or more messaging platforms and an account on each of the one or more determined messaging platforms on which to share the user created content.

8. A computer program product for information sharing, the computer program product comprising:
    one or more computer-readable storage devices and program instructions stored on at least one of the one or more tangible storage devices, the program instructions comprising:
        program instructions to receive, by a computer, user created content from a user;
        program instructions to extract information, comprising one or more types of information, by a computer, from the user created content, wherein at least one type of information is semantic concepts;
        program instructions to determine, by a computer, one or more messaging platforms on which to share the user created content, based on at least a correlation between: the extracted information; and historical data correlating the extracted information with what messaging platforms the user created content was sent to;
        program instructions to notify the user of the one or more determined messaging platforms;
        program instructions to receive a selection from the user of one of the one or more determined messaging platforms; and
        program instructions to transmit the user created content to the selected messaging platform.

9. The computer program product of claim 8, wherein program instructions to notify the user of the one or more determined messaging platforms further comprises program instructions to notify the user of the one or more determined messaging platforms in a ranked order based on the degree of correlation between the extracted information, and historical data correlating which extracted information was sent to which messaging platforms.

10. The computer program product of claim 8, wherein the historical data comprises one or both of:
    historical data correlating which extracted information the user sent to which messaging platforms; and
    historical data correlating which extracted information a plurality of users sent to which messaging platforms.

11. The computer program product of claim 8, further comprising program instructions to update the historical data with information related to the user selected messaging platform and the extracted information.

12. The computer program product of claim 8, wherein the historical data contains historical data correlating characteristics of the user with which messaging platforms the user created content was sent to.

13. The computer program product of claim 8, wherein the one or more types of information further includes metadata describing one or more of: type of the user created content, size of the user created content, date of the user created content, originating platform of the user created content, and creator of the user created content.

14. The computer program product of claim 8, wherein determining, by a computer, one or more messaging platforms on which to share the user created content further comprises determining, by a computer, one or more messaging platforms and an account on each of the one or more determined messaging platforms on which to share the user created content.

15. A computer system for information sharing, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive, by a computer, user created content from a user;
program instructions to extract information, comprising one or more types of information, by a computer, from the user created content, wherein at least one type of information is semantic concepts;
program instructions to determine, by a computer, one or more messaging platforms on which to share the user created content, based on at least a correlation between: the extracted information; and historical data correlating the extracted information with what messaging platforms the user created content was sent to;
program instructions to notify the user of the one or more determined messaging platforms;
program instructions to receive a selection from the user of one of the one or more determined messaging platforms; and
program instructions to transmit the user created content to the selected messaging platform.

16. The computer system of claim 15, wherein program instructions to notify the user of the one or more determined messaging platforms further comprises program instructions to notify the user of the one or more determined messaging platforms in a ranked order based on the degree of correlation between the extracted information, and historical data correlating which extracted information was sent to which messaging platforms.

17. The computer system of claim 15, wherein the historical data comprises one or both of:
historical data correlating which extracted information the user sent to which messaging platforms; and
historical data correlating which extracted information a plurality of users sent to which messaging platforms.

18. The computer system of claim 15, further comprising program instructions to update the historical data with information related to the user selected messaging platform and the extracted information.

19. The computer system of claim 15, wherein the historical data contains historical data correlating characteristics of the user with which messaging platforms the user created content was sent to.

20. The computer system of claim 15, wherein the one or more types of information further includes metadata describing one or more of: type of the user created content, size of the user created content, date of the user created content, originating platform of the user created content, and creator of the user created content.

* * * * *